R. G. FEAR.
STORAGE BATTERY.
APPLICATION FILED FEB. 7, 1920.
1,396,172.
Patented Nov. 8, 1921.
2 SHEETS—SHEET 2.
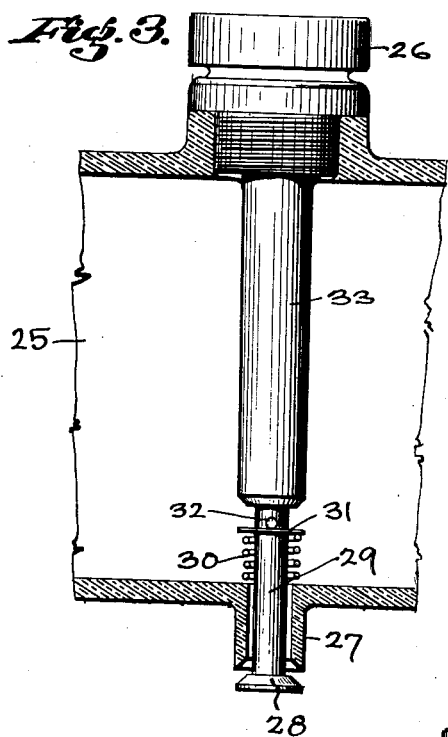
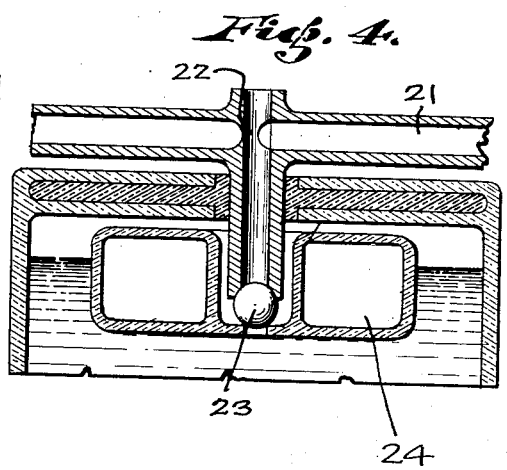
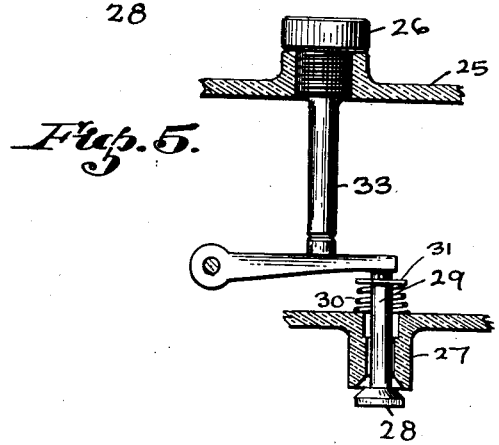
WITNESS
Lincoln Johnson
INVENTOR
Ralph G. Fear
BY
K Baldwin Vale
ATTORNEY

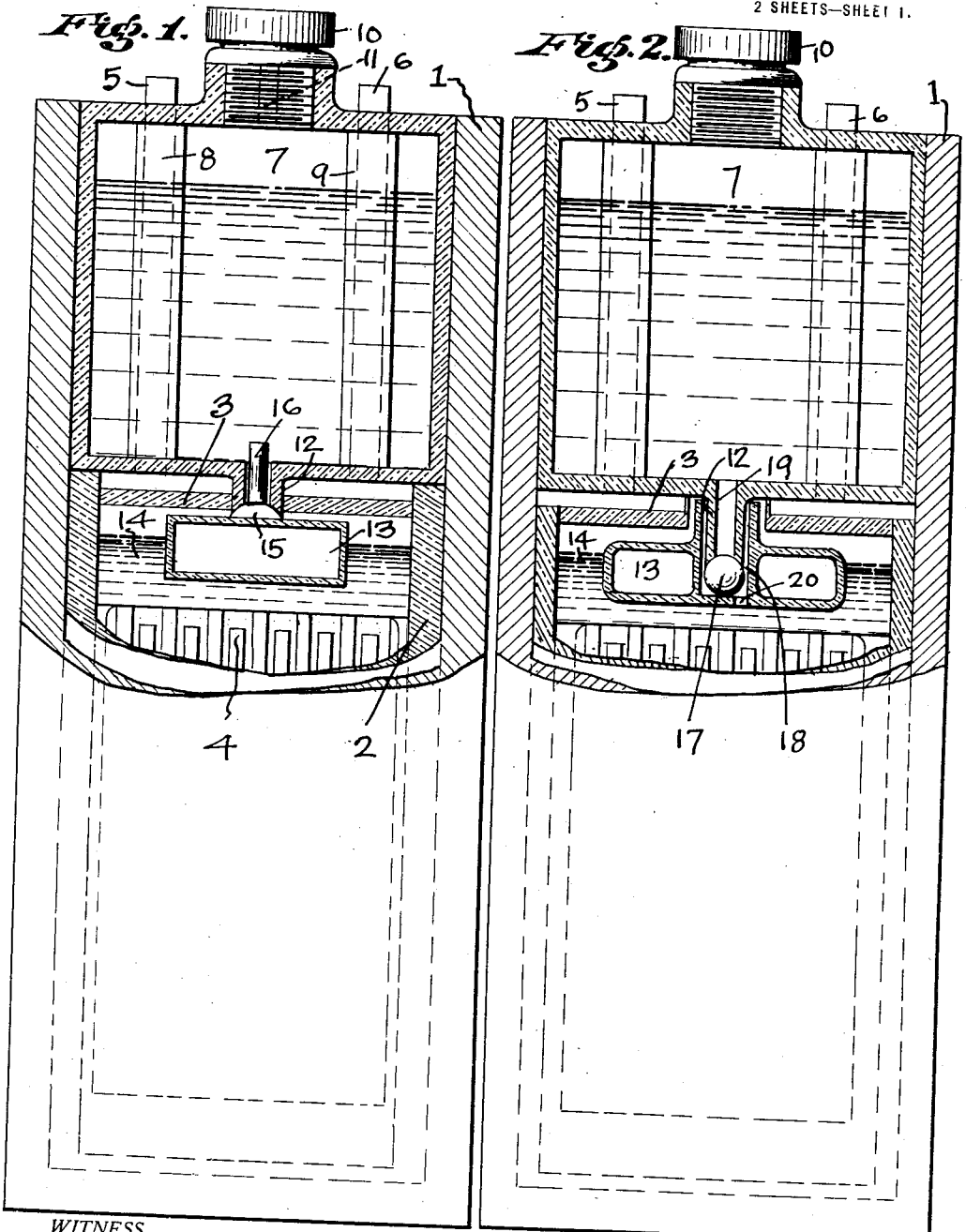

UNITED STATES PATENT OFFICE.

RALPH G. FEAR, OF OAKLAND, CALIFORNIA.

STORAGE BATTERY.

1,396,172.

Specification of Letters Patent. Patented Nov. 8, 1921.

Application filed February 7, 1920. Serial No. 356,921.

*To all whom it may concern:*

Be it known that I, RALPH G. FEAR, a citizen of the United States, residing at the city of Oakland, county of Alameda, State of California, have made a new and useful invention—to wit, Improvements in Storage Batteries; and I do hereby declare the following to be a full, clear, concise, and exact description of the same.

The invention relates particularly to storage batteries of the fluid type or semifluid.

Among the object of the invention are to provide means for automatically maintaining a constant level of the electrolyte or solution within the cells of the storage battery. Other objects and advantages will appear as this description progresses.

In this specification and the annexed drawings, the invention is illustrated in the form considered to be the best, but it is to be understood that the invention is not limited to such form because it may be embodied in other forms; and it is also to be understood that in and by the claims following the description it is desired to cover the invention in whatever form it may be embodied.

Storage batteries of the liquid or semi-liquid type comprise a suitable box, having a series of cells therein within which alternate positive and negative plates are arranged with suitable interposed insulation. Each cell is filled to near its top, submerging the plates and the cover. It is important that these plates be kept submerged. By natural forces augmented by the charging and discharging of the battery the electrolyte is evaporated and will uncover the upper portions of the plates unless the electrolyte or water is replenished from time to time.

In the accompanying two sheets of drawings,

Figure 1 is a vertical section of a storage battery constructed in accordance with this invention.

Fig. 2 is a fragmentary detail illustrating a modification of the float valve.

Fig. 3 is a fragmentary detail illustrating the application of the vacuum type of feed.

Fig. 4 is a fragmentary detail in cross section illustrating the manifold method of supplying the various cells from a single source of supply.

Fig. 5 is a fragmentary detail of a modified form of valve control means.

In detail the construction illustrated in the drawings referring to Fig. 1 includes an inclosing box 1, having one or more cells 2, of glass, hard rubber or other suitable material set within the box 1. These cells are provided with suitable covers 3, inclosing the plate 4 attached to a bus bar and arranged in alternate, positive and negative formation and having terminal rods 5 and 6 extending upward, from their respective bus bars, above the top of the box 1 for the attachment of suitable terminals, in the usual manner.

The water reservoir 7 is preferably composed of hard rubber composition of the same dimension as the top of the cells 2 and of proper depth to carry sufficient distilled water for replenishing the cell beneath for several months, having in mind the desirability of small size and compactness of the battery as a whole. These reservoirs 7 are in this application provided with vertical tubes 8 and 9 sealed off from the interior of the reservoir to pass the rods 5 and 6. These reservoirs are provided with the filler caps 10 which may be vented to the atmosphere through 11. The bottoms of the reservoirs are provided with the downwardly extending necks 12, extending through the cell covers 3 and are provided with valve seats in their lower ends.

The floats 13 rest buoyantly on the electrolyte 14 and are provided on their tops with the valves 15 registering with the valve seats in the necks 12. The valve stems 16 extend upward, from the floats and are slidably guided in the necks 12, to steady the operation of the floats and prevent their dislodgment due to surging or movement of the electrolyte.

Since the evaporation of the electrolyte merely condenses the strength of that remaining it is only necessary to restore the volume by the addition of distilled water.

Because of the generation of gas within the cells, they may or may not be vented through the covers 3, the gas escaping through the tubes 8 or otherwise. As the level of the electrolyte is lowered by evaporation the float descends, permitting liquid from the reservoir 7 to leak past the valve 15 into the cell, until the rise of the electrolyte lifts the valve 15 to its seat, shutting off the supply. This operation continues until the liquid is exhausted from the reservoir, which may be replenished through the screw cap 10. The type above described and illustrated in Fig. 1 operates either by gravity or by barometric pressure.

Fig. 2 illustrates a modification of the same, permitting the rising of a ball 17 set within a cell 18 of a float encircling the neck 19 of the reservoir. The well is provided at its bottom with the outlet 20, set off center so that it will not be closed by the ball 17. One advantage of this ball type is that the rolling and surging of the electrolyte, when the battery is used in a motor vehicle or boat, disturbing the float, it will not in turn dislodge the ball 17 from the valve seat in the end of the neck 19. The operation of the device is the same as described in Fig. 1.

A similar float structure is shown in Fig. 4, in which the manifold 21 is connected to a single tank and provided with outlet necks 22 leading to the individual cells and closed by the balls 23 operated by the float 24, as described in connection with Fig. 2. The advantage of such a structure is that the water reservoir need not be built onto the structure of the battery, as illustrated in Figs. 1 and 2, but may be remotely located in any convenient place. This type is useful in converting existing batteries to this system.

In Fig. 3 a further modification is shown by which the liquid is fed by barometric pressure. The structure comprises the usual reservoir 25 sealed by the unvented cap 26. The bottom of the reservoir is provided with the neck 27, extending downwardly into the cell so as to be submerged at the desired level of the electrolyte. This neck is provided with a valve seal with which the valve 28 registers. The valve stem 29 extends upwardly and is surrounded by a compression spring, expanding between the bottom of the reservoir and the washer 31 held by the pin 32 extending through the valve stem 29. The filler cap 26 is provided with the downward extension 33 bearing against the valve stem 29, to normally hold the valve 28 unsealed. The purpose of this valve, when sealed by the spring 30, is to prevent the emptying of the reservoirs into the cell when the filler cap 26 is removed admitting atmospheric pressure. This barometric type operates as follows: When the electrolyte recedes, uncovering the valve seal, air is admitted through the neck 27, breaking the barometric seal and permitting the water to flow into the cell until the end of the neck 27 is again submerged. Such operation being automatic until the water is exhausted from the reservoir.

Having thus described this invention what I claim and desire to secure by Letters Patent is:

1. In combination with a storage battery; a reservoir for liquid; automatic means for feeding said liquid from said reservoir into said battery; according to a definite level in said battery.

2. In combination with a storage battery, a fluid reservoir having multiple passages to independent cells of said battery; float valves in each of said cells for automatically opening and closing said passages according to the liquid levels in the respective battery cells.

In testimony whereof I have hereunto set my hand at San Francisco, California, this 22nd day of January, 1920.

RALPH G. FEAR.

In presence of—
LINCOLN V. JOHNSON.